US008832590B1

(12) United States Patent
Al-Mohssen

(10) Patent No.: US 8,832,590 B1
(45) Date of Patent: Sep. 9, 2014

(54) DYNAMICALLY MODIFYING USER INTERFACE ELEMENTS

(75) Inventor: Husain Al-Mohssen, Cambridge, MA (US)

(73) Assignee: Google Inc., Mountain View, CA (US)

( * ) Notice: Subject to any disclaimer, the term of this patent is extended or adjusted under 35 U.S.C. 154(b) by 1179 days.

(21) Appl. No.: 12/202,852

(22) Filed: Sep. 2, 2008

Related U.S. Application Data

(60) Provisional application No. 60/969,531, filed on Aug. 31, 2007.

(51) Int. Cl.
*G06F 3/048* (2013.01)
*G09G 5/00* (2006.01)

(52) U.S. Cl.
USPC ............ 715/785; 715/783; 715/811; 345/684

(58) Field of Classification Search
CPC .............................. G06F 3/0482; G06F 3/0485
USPC ......... 715/744, 745, 747, 764, 765, 810, 811, 715/812, 813, 821, 825, 783, 78; 345/684
See application file for complete search history.

(56) References Cited

U.S. PATENT DOCUMENTS

| | | | | |
|---|---|---|---|---|
| 6,038,561 | A * | 3/2000 | Snyder et al. ................. | 715/202 |
| 6,067,069 | A * | 5/2000 | Krause ........................... | 345/685 |
| 6,337,694 | B1 * | 1/2002 | Becker et al. ................. | 715/785 |
| 2008/0033996 | A1 * | 2/2008 | Kesari ........................... | 715/244 |

OTHER PUBLICATIONS

Wikipedia, "Scrolling", http://en.wikipedia.org/wiki/Scrolling, published on or before May 11, 2013, 4 pages.
Wikipedia, "Scrollbar", http://en.wikipedia.org/wiki/Scrollbar, published on or before Sep. 11, 2013, 4 pages.
Eslambolchilar et al., "Control Centric Approach in Designing Scrolling and Zooming User Interfaces", Elsevier—Science Direct, Int. J. Human-Computer Studies, vol. 66, Published in 2008, pp. 838-856.
Birch, "Knobs and Dials in Mobile App Interfaces", http://designmodo.com/knobs-dials-mobile-app/, Aug. 6, 2013, 15 pages.
Apple, Inc., "Date Pickers", https://developer.apple.com/library/ios/documentation/userexperience/conceptual/UIKitUICatolog/UIDatePicker.html, published on or before Dec. 16, 2013, 3 pages.
Actual Tools, "Snap", http://www.actualtools.com/windowmanager/help/features/snap.php, Copyright 2012-2013, 1 page.
The Verge staff, "iOS: A Visual History", http://theverge.com/2011/12/13/2612736/ios-history-iphone-ipad, Sep. 16, 2013, 25 pages.
Quilty-Harper, Conrad, "The Definitive iPhone User Interface Gallery", http://www.engadget.com/2007/06/30/the-definitive-iphone-user-interface-gallery/, Jun. 30, 2007, 3 pages.
Wikipedia, "History of the Graphical User Interface", http://en.wikipedia.org/wiki/History_of_the_graphical_user_interface, published on or before Dec. 24, 2013, 18 pages.

* cited by examiner

*Primary Examiner* — Haoshian Shih
(74) *Attorney, Agent, or Firm* — Fish & Richardson P.C.

(57) ABSTRACT

A method includes identifying a user interface element that includes a plurality of sub-elements. The method also includes updating one or more attributes associated with presenting the user interface element to emphasize one or more sub-elements independent of modifying the presentation of the one or more sub-elements.

40 Claims, 5 Drawing Sheets

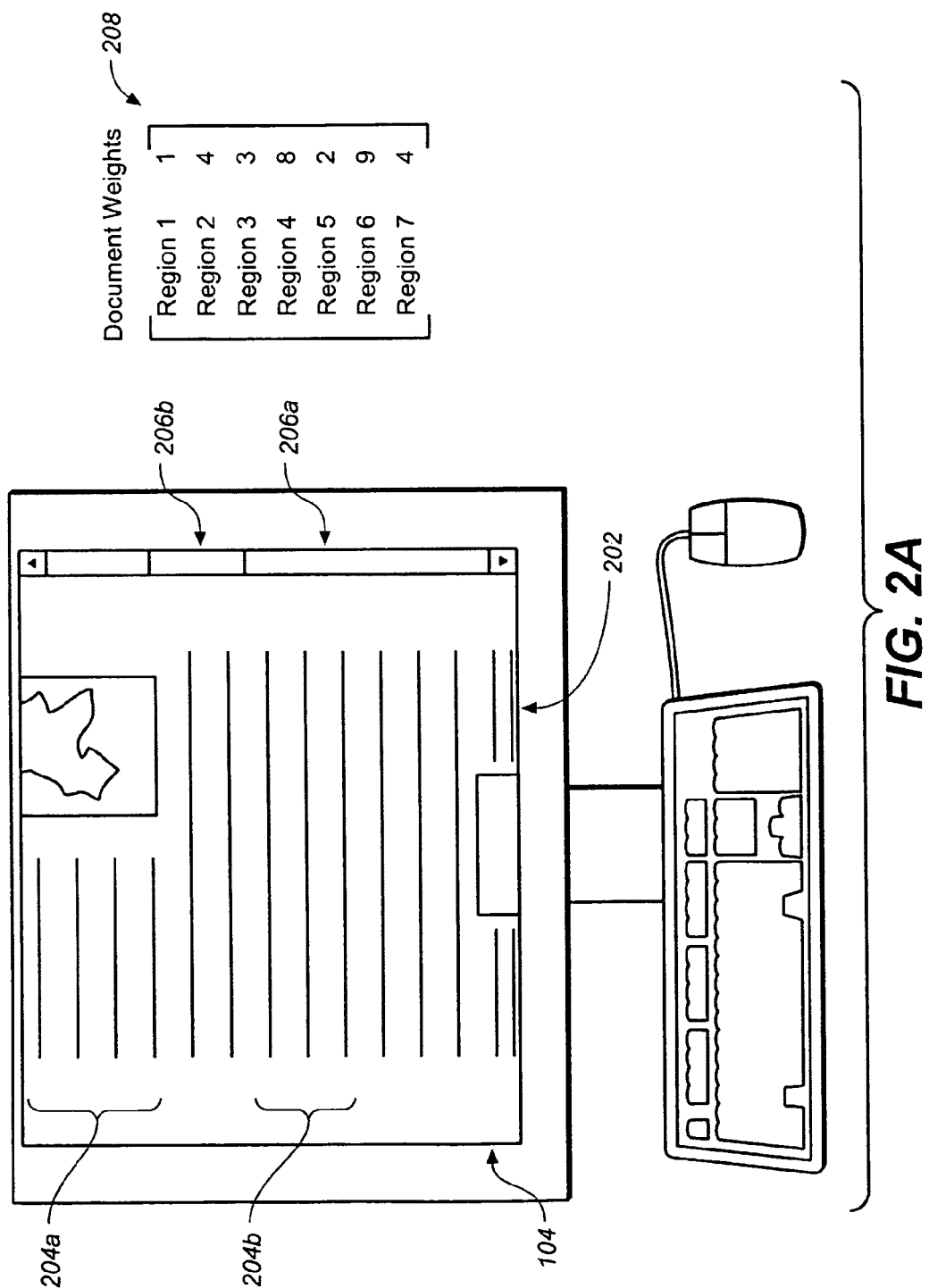

DYNAMICALLY MODIFYING USER INTERFACE ELEMENTS

CROSS-REFERENCE TO RELATED APPLICATION

This application claims priority to U.S. Provisional Patent Application Ser. No. 60/969,531 filed Aug. 31, 2007, and entitled "Dynamically Modifying User Interface Elements," the contents of which are incorporated herein by reference.

TECHNICAL FIELD

The subject matter disclosed in this specification relates to graphical user interfaces.

BACKGROUND

A graphical user interface (GUI) is a type of user interface which allows people to interact with a computer and computer-controlled devices. GUIs conventionally employ special graphical elements called "widgets," as well as text and labels to represent information to a user. A user's interactions through direct manipulation of the graphical elements allow GUIs to obtain information or input from a user.

SUMMARY

Disclosed herein are systems, methods and computer program products for dynamically modifying user interface elements. In general, one aspect of the subject matter described in this specification can be embodied in a method that includes identifying a user interface element that includes a plurality of sub-elements. The method also includes updating one or more attributes associated with presenting the user interface element to emphasize one or more sub-elements independent of modifying the presentation of the one or more sub-elements. Other embodiments of this aspect include corresponding systems, and computer program products.

These and other embodiments can optionally include one or more of the following features. The sub-elements can include one of the set consisting of: sub-regions of a document, menu elements of a pull-down menu, tiles in a map, images in a grouping of images, entry fields in a form, and divisions of a slider widget. The one or attributes can include the speed at which a user interface element traverses the sub-elements. The one or more attributes can be a scroll bar associated with the user interface element, and a background of the scroll bar; wherein sub-areas within the background correspond to relative positions of the sub-elements within the user interface element. Updating one or more attributes can include selectively changing the color or luminance of one or more sub-areas in the background to emphasize one or more sub-elements. Updating the one or more attributes can include assigning a weight to each sub-element, and assigning one or more rules that update the one or more attributes of the user interface element in accordance with the weights of the sub-elements. The weight can be determined by a likelihood that the sub-element will be examined. The weight can also be determined by a likelihood that the sub-element will be selected. The weight can be determined by a proximity of the sub-element to a default sub-element. The weight can also be determined by characteristics of a user. The characteristics of a user can include the geo-location of a user or a past history of a user.

Particular embodiments of the subject matter described in this specification can be implemented to realize one or more of the following advantages. A user interface may be enabled to suggest to a user the proper input for a widget or the proper focus without complicating the view. The speed with which a user navigates a widget and the efficiency associated with using a widget may be increased. A user's overall experience using a user interface may be enhanced.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

FIGS. 2A-2C are illustrations of example weighted user interface element systems.

Like reference numbers and designations in the various drawings indicate like elements.

DETAILED DESCRIPTION

Modern computer applications and operating systems in their graphical user interfaces make extensive use of windows, a bounded area on a computer's screen, to display information, such as text and graphics. Typically, a window displays its contents independently from the rest of the screen or other windows. There are numerous examples of operating systems that incorporate or otherwise utilize windowing systems and/or managers as part of the interface with a user, such as, by way of example only, Windows Vista by Microsoft Corp. of Redmond, Wash. and Mac OS X by Apple, Inc. of Cupertino, Calif. Windows are typically composed of controls and/or components, sometimes referred to as "widgets." Common window components include, for example, menus, checkboxes, textboxes, buttons, text editors, panels, and the like.

Content, such as text and graphics, can be presented in a graphical user interface component, such as a panel or pane of the window, which is a sub-section of the window. In some cases, only a portion of the content may be viewed inside the window because the amount of content exceeds the amount that can be displayed. For example, a user navigating the Internet through a web browser may enter a web page that cannot be fully viewed all at once inside the web browser. A user searching for particular content may have to scroll through multiple screens or pages of content in order to find the portion of the content that interests the user. In order to display the off-screen content, graphical user interface components have been created to allow a user to scroll through the content and choose what content is displayed. A scrollbar component integrated in the window displaying the content can be used by a user to control which portion of the content is displayed in the window at a given time. Other mechanisms, such as a scroll wheel or ball on a mouse or a finger flick on a touch screen, can be used to signal a graphical user interface to move through the content.

Attributes of a user interface can be modified in order to emphasize certain portions of the content that most interests a user. For example, the speed at which content is traversed or navigated during a scrolling action can be varied depending on the importance of the content. As another example, a graphical user interface component, such as a scroll bar can be modified to visually depict clusters of important content.

Figure 1:
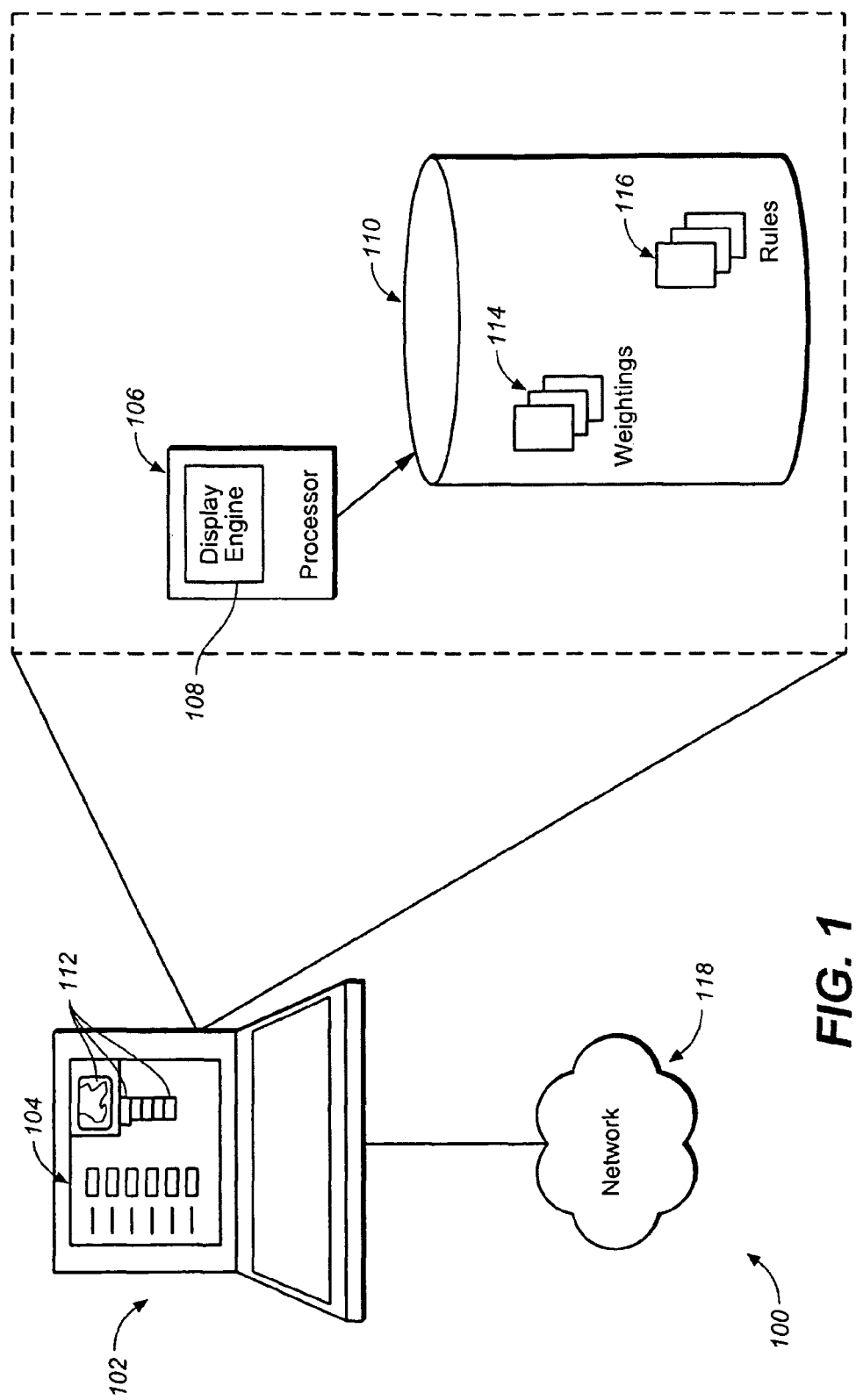
FIG. 1 is a block diagram of a user-interface system.

FIG. 1 is a block diagram of a system 100 for modifying user interface elements. The system 100 may dynamically modify attributes of a user interface to emphasize one or more portions within the user interface independent of modifying presentation of the portions. One attribute that may be dynamically modified to emphasize certain portions is the rate or speed of scrolling through the portions. For example, a web page that contains several viewable frames of content may have only two or three portions of information that are of interest to a user. A user navigating the contents of the web page may scroll through the document, using the scroll wheel or ball on a mouse, the arrow or paging keys on a keyboard, and/or a graphical scroll bar (the knob or the up/down arrows). Using the system 100, the speed with which the uninteresting content is traversed may increase and the speed of traversing or scrolling through the interesting content may be reduced. The reduction in speed can alert the user that interesting content is currently being displayed and simultaneously can allow the content to be displayed longer in the viewing area. Another attribute that may be modified is the background color in a graphical scroll bar. The color within various sub-areas of the background of a scroll bar may be changed to reflect the relative emphasis placed on portions of a document that correspond to colored sub-areas of the scroll bar. Other attributes may be changed and may depend on the user interface element that is being modified. Some other examples include: the pan rate of a map, the rate that ticks are traversed in a slider widget, the rate at which a user may tab from field to field in an electronic form, and/or others.

As show in FIG. 1, the system 100 may contain a computer 102 that includes a graphical user interface (GUI) 104, a processor 106, a display engine 108, and a memory 110 that may store weighting files 114 and rules 116. At a high level, the display engine 108 uses the weighting files 114 and rules 116 to dynamically render in the GUI 104 user interface elements emphasizing certain information independent of modifying the presentation of that information. The computer 102 is an electronic computing device operable to receive, transmit, process and store data associated with system 100. Indeed, computer 102 may be any computer or processing device such as, for example, a blade server, general-purpose personal computer (PC), Macintosh, workstation, Unix-based computer, or any other suitable device. In other words, the present disclosure contemplates computers other than general purpose computers as well as computers without conventional operating systems. Computer 102 may be adapted to execute any operating system including Linux, UNIX, Windows, or any other suitable operating system. Moreover, the computer 102 may be, e.g., a mobile telephone, a personal digital assistant (PDA), a mobile audio player, a smart phone, a Global Positioning System (GPS) receiver, a notebook computer, a desktop computer, or a server, to name just a few possible examples. In some embodiments, the computer 102 is connected to a network 118. The computer may also include or be connected to a display.

The computer 102 may display a GUI 104 to receive input from and provide output to a user. GUI 104 comprises a graphical user interface operable to allow the user of computer 102 to interface with at least a portion of system 100 for any suitable purpose, such as viewing application or other transaction data and visual content, such as maps, text, pictures, and other graphics. Generally, GUI 104 provides the particular user with an efficient and user-friendly presentation of content provided by or communicated to system 100. GUI 104 may comprise multiple user interface elements 112. Such user interface elements include, but are in no way limited to, pull-down lists, buttons, map viewers, document viewers, image galleries, forms containing multiple fields, sliders used to select parameter values, and many others. GUI 104 contemplates any graphical user interface, such as a generic web browser, touchscreen application, word processor, or any other stand-alone or distributed application that processes information in system 100 and presents information to the user.

As illustrated, computer 102 includes a processor 106 and a memory 110. Processor 106 executes instructions and manipulates data to perform the operations of computer 102. A processor may include any electronic data processing apparatus, such as, for example, a central processing unit (CPU), a blade, an application specific integrated circuit (ASIC), or a field-programmable gate array (FPGA). Generally, the processor 106 will be operatively coupled to receive data and/or instructions from, or transfer data to, the memory 110. The processor 106 and some or all of the data stored in the memory 110 can be supplemented by, or incorporated in, special purpose logic circuitry, such as an application-specific integrated circuit.

The display engine 108 can be any software, hardware, and/or firmware that renders the GUI 104 and manipulates one or more user interface elements. For example, the display engine 108 can modify an element, such that the element has the ability to emphasize certain information in the window without necessarily modifying the presentation of that information. For example, a display engine 108 may manipulate the interface elements of a web browser such that the appearance of the content, such as the text size and color or image size, of a web page is unchanged, but the way in which the content is presented, such as the scroll speed, may change to emphasize certain parts of the content.

Figure 3:
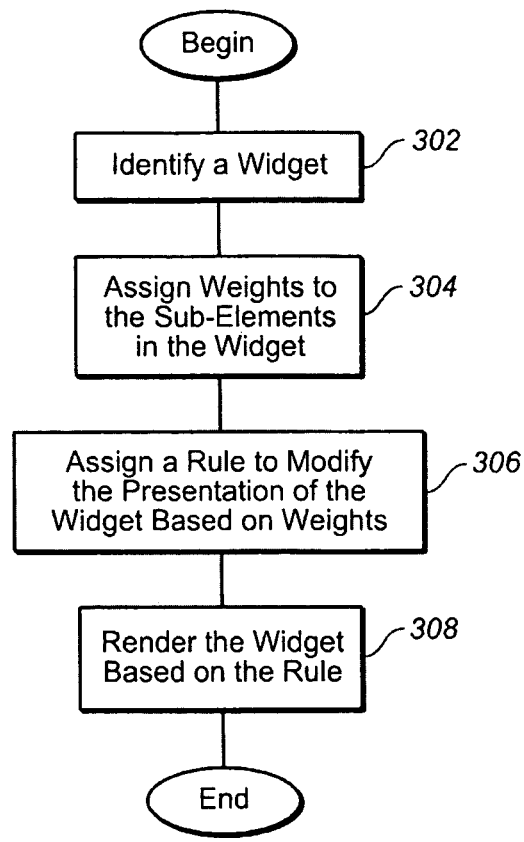
FIG. 3 is a flow chart illustrating an example method for dynamically modifying user interface elements.

The display engine 108 may be used to implement the process described in FIG. 3. The steps that the display engine 108 may perform may include: identifying a user interface element; assigning weights 114 to the sub-elements of the user interface element; assigning a rule 116 to modify the one or more display or presentation attributes of the user interface element based on the weights 114 of the sub-elements; rendering the user interface element based on the rule(s) 116; and/or others. All of these steps need not be executed in order to for the display engine to dynamically modify a user interface element. The processor 110 may execute other steps, which may or may not be included in the display engine 108. In some implementations, the display engine 108 may execute one or more of the following: receive a request for a user interface element 112; identifying the user interface element 112; identify associated weighting files 114 and/or rules 116; dynamically modify attributes of the interface element 112 in accordance with the weighting files 114 and/or rules 116; and/or others.

The memory 110 may also be remote and connected to computer 102 through a network, such as network 118. The memory 110 is computer readable media suitable for storing computer program instructions and data. The memory 110 may be any form of non volatile memory, media and memory devices, including by way of example random access memory (RAM), read-only memory (ROM), or other memory devices, such as, e.g., EPROM, EEPROM, and flash memory devices; magnetic disks, e.g., internal hard disks or removable disks; magneto optical disks; and CD ROM and DVD-ROM disks. The memory may include weighting files 114 and rules 110. Although shown separately, the memory 110 may also include display engine 108.

User interface elements 112 are widgets, controls, and/or components in a GUI 104. User interface elements 112 may contain more than one element or may refer to closely associated discrete user interface elements. User interface elements 112 may contain sub-elements. The sub-elements may be pre-defined for each user interface element 112 or they may be defined ad-hoc based on properties of the user interface element 112. The sub-elements may be defined by sub-sections of the content displayed in a user interface element. For example, sub-elements may include the fonts in a menu of fonts. As another example, sub-elements may include sub-regions of a web document where the regions are determined ad-hoc from clusters of certain information, such as text tags (e.g., Table Of Contents, Headers, font size, links, etc.) and/or number and sizes of images and equations. Other sub-elements include: menu items in a menu, ticks in a slider widget, tiles of a map, images in a image viewer, posts in a weblog, and any other sub-set of information that may be presented to a user in a user interface.

Weighting files 114 are data structures used to store information including or otherwise identifying weights associated with sub-elements within each user interface element. For example, the weighting file 114 may identify a weight for a certain portion of text indicating that the certain portion is to be emphasized when displayed in a user interface element. Weighting files 114 may store an identifier for each sub-element with a corresponding value representing the weight. There are many ways that the weight information for the sub-elements may be organized within weighting files 114. The information stored in weighting files 114 may be related to the likelihood that certain sub-elements may be of interest to a user. Sub-elements having a high likelihood or probability of interest may be assigned higher weights in the weighting files 114 than those having a low likelihood of interest. The likelihood of interest may be determined as a function of the density of text tags and/or images in sub-sections of a document. For example, the weighting file 114 may indicate that a certain collection of lines in a document have a relatively high concentration of images. For a map, the weighting files 114 may indicate that certain tiles have a high density of roads and/or buildings and thus may be more likely to be examined by a user. The weighting files 114 may also be related to the characteristics of a user (e.g., where the user is surfing from, the user's history, the search terms indicated by a user, etc.) or certain default values (e.g., in a slider widget weighting files 114 assign weights based on the proximity of each tick or sub-division to a default or preferred value.

Rules 116 are any parameters, variables, policies, algorithms, instructions, settings, or rules for modifying attributes of the interface 112 in accordance with the weights. For example, a rule may be that the weights of the various sub-regions of a document are summed, and the rate that the sub-regions are traversed is equal to the inverse of the weight of the element divided by the sum of all weights. In some implementations, the rules 116 may include or otherwise identify one or more of the following: an identifier of a user interface element 112, an indicator of which attribute of the user interface element to adjust, how to adjust an attribute in response to the weights of the sub-elements in the user interface element, and/or others. These rules 116 may apply across different types of user interface elements 112 or may be specified differently for different user interface elements 112 having the same type. The rules 116 may indicate one or more attributes to update in response to the weight files, such as the speed at which a user interface element traverses the sub-elements. For example, the rule 116 may specify for a pull-down list that the scroll rate is to be adjusted based on the associated weight files 114. In a form field, the speed at which a user may tab from one element to the next may be adjusted. The rules 116 may also indicate attributes other than rate of traversal, such as color. For example, the color of the background of a scroll bar associated with a user interface element may be adjusted base on the weight files 114. Sections of the scroll bar that correspond to sub-elements or sub-regions of a user interface element 112 to be emphasized may have the background colored differently, such as increasing the background color's saturation or luminance. Each rule 116 may be associated with a single or multiple user interface elements and/or sub-elements. The rules 116 can be used to emphasize sub-elements without changing the presentation or "look and feel" of the sub-elements. For example, a sub-element that is a section of text can be emphasized without changing the presentation of the text, such as the text's size, color, font, or style. Where the sub-element is a tile in a map, the tile can be emphasized without changing its color or shape. Menu items that are sub-elements can be emphasized without changing the size or shape of the menu items or the font of the text contained in the menu items.

In operation, the display engine 108 may receive a request to display a user interface element 112. In response to the request, the display engine 108 identifies the user interface element and associated weighting files 114 and rules 116. In some implementations, weights may have been calculated when the information in document 202 was first loaded based on some pre-determined criteria, such as the density of images or some other indication of potential user interest. Where the document is loaded based on a search, the indications of user interest can be related to where the search terms appear in a document 202. The display engine 108 determines the sub-elements and their corresponding weights based, at least in part, on the identified weighting files 114. The display engine 108 renders the particular user interface element 112 using the rules 116 and the associated weights 114.

Figure 2B:
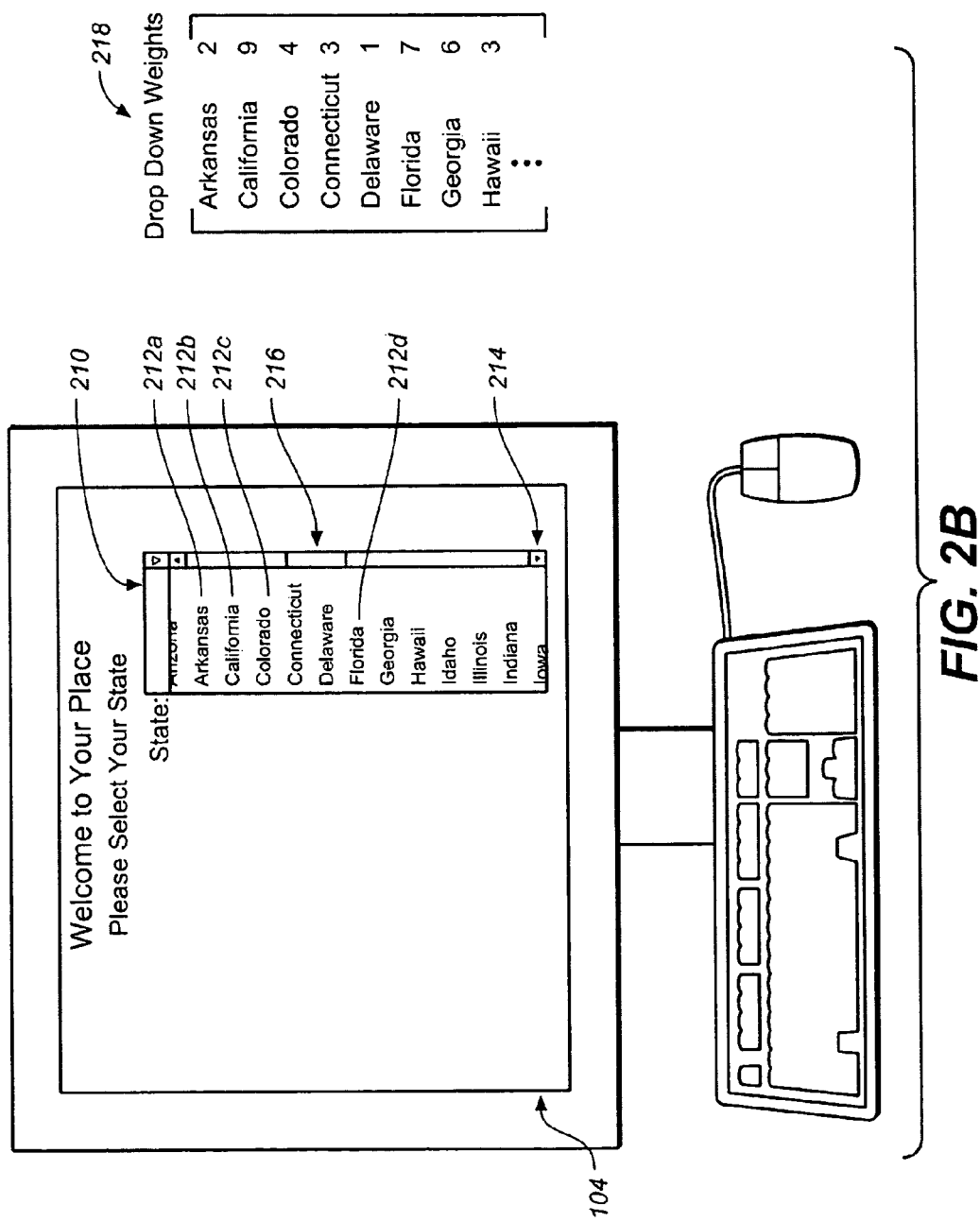
Figure 2C:
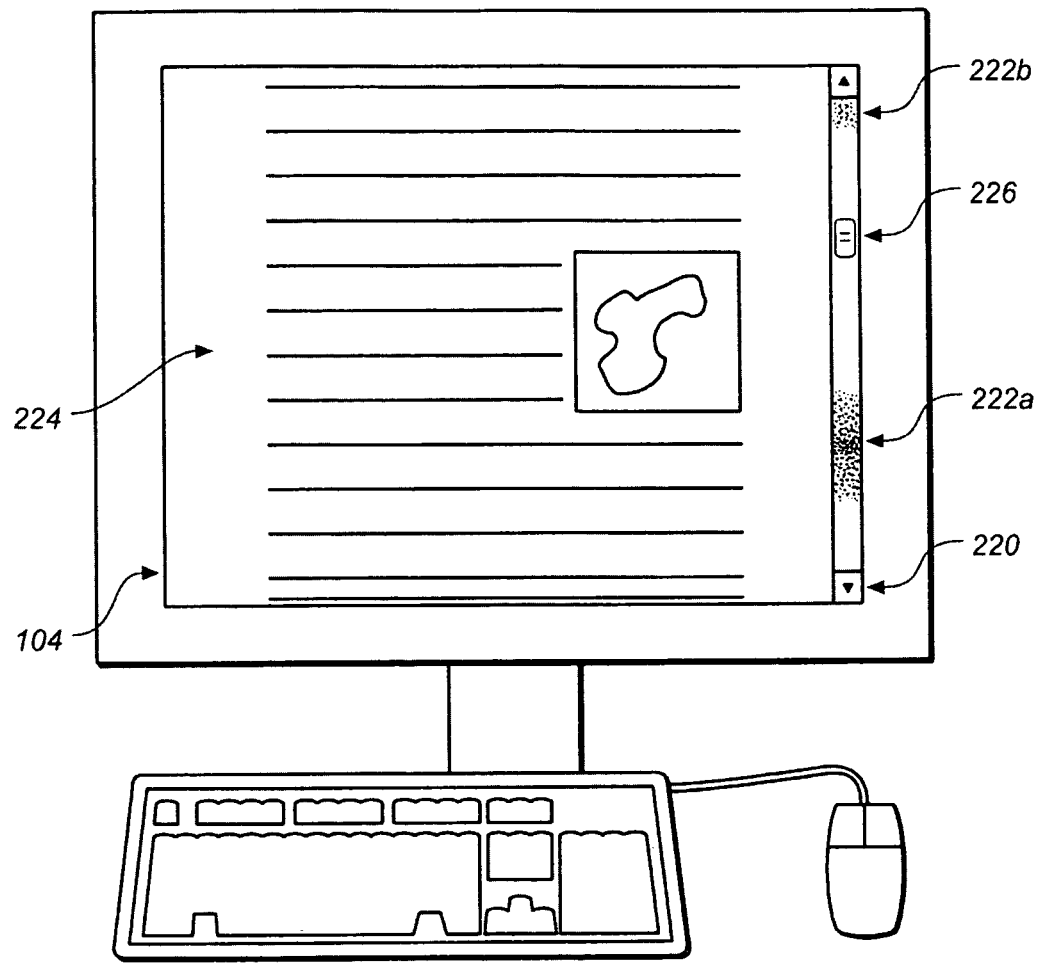

FIGS. 2A-2C are illustrations of example GUIs 104 of the FIG. 1. Referring to FIG. 2A, the GUI 104 contains a document user interface element 202 and an associated scroll bar 206. The document 202 may be divided into sub-regions 204. Each sub-region 204 may have an associated weight indicating relative importance. In some implementations, the one or more weight files store the weight information, as discussed above. In some implementations, the regions 4 and 6 of the document 202 have relatively high associated weights. As a result, the document 202 can, in some implementations, have different scroll rates for regions 4 and 6 as compared with other regions. For example, the scroll rate for regions 4 and 6 may be substantially lower than scroll rates for other regions. In the example, the user of GUI 104 would rapidly scroll through sections 1-3 and 5 and slowly scroll through regions 4 and 6.

Referring to FIG. 2B, the GUI 104 includes a pull-down menu 210 and an associated scroll bar 214. The pull-down menu 210 includes sub-elements 212 representing states in the U.S.A. The dropdown weights 218 may be assigned by a likelihood that the user may select the sub-element 212. For example, a user having a geo-location in California is more likely to select California. If the location of the user is unknown, each state's population may be used to determine the likelihood that it would be selected. As a user scrolls down the list using scroll box 216, the speed of the box may be relatively high until sub-element 212b, which represents California having a weight of 9, is displayed in the GUI 104. The scroll rate may increase and begin to slow as the sub-element 212 representing Texas (not shown) enters the GUI 104.

The scroll rate is one of many attributes that may be modified according to the weight of each sub-element. For example, the color or luminance of a scroll bar may be modified. Turning to FIG. 2C, a GUI 104 containing a document 224 and associated scroll bar 220 is illustrated. The background color of the scroll bar 220 may be varied according to the weight of the sub-regions of the document 224. A user may look to the scroll bar 220 and notice sub-area 222a or sub-area 222b. These sub-areas 222 may indicate that interesting information is likely located in those positions of the document 224. A user may drag the scroll box 226 to a sub-area 222. The sub-area 222 may be a color gradient, a luminance gradient, a saturation gradient, or any other indicator distinguishing the sub-area from the remainder of the scroll bar 220.

FIG. 3 is a flow chart illustrating a method 300 for dynamically modifying user interface elements. Generally, the method 300 involves weighting sub-elements of a user interface element and adjusting an attribute of the user interface element to emphasize the sub-element. At step 302, a user interface element is identified. The user interface element may have pre-defined sub-elements contained with in it. At step 304, weights are assigned to the sub-elements of the user interface element. These weights may be assigned based on a one or more parameters. In some implementations, the parameters include one or more of the following: a probability that the sub-element may be examined or selected; proximity of the sub-element to a default or preferred sub-element, preferences or history of a user, user's location, or any combination of these factors. At step 306, a rule is assigned to modify a presentation attribute of the user interface element based on the weights of the sub-elements. The attribute may be the speed at which the user interface element moves from one sub-element to another. The attribute may also be the color of a scroll bar associated with the user interface element. The actual presentation of the sub-elements can remain unmodified. For example, a sub-element that is a section of text can be emphasized without changing the presentation of the text, such as the text's size, color, font, or style. Where the sub-element is a tile in a map, the tile can be emphasized without changing its color or shape. At step 308, the user interface element is rendered.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor may receive instructions and data from a read-only memory or a random access memory or both. The essential elements of a computer are a processor for performing instructions and one or more memory devices for storing instructions and data. Generally, a computer can also include, or be operatively coupled to receive data from or transfer data to, or both, one or more mass storage devices for storing data, e.g., magnetic, magneto-optical disks, or optical disks. However, a computer is not required to have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

An electronic document (which for brevity may simply be referred to as a document) does not necessarily correspond to a file. A document may be stored in a portion of a file that holds other documents, in a single file dedicated to the document in question, or in multiple coordinated files.

While this specification contains many specifics, these are not limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this does not require that such operations be performed in the particular order shown or in sequential order, or that all illustrated operations be performed, to achieve desirable results. In certain circumstances, multitasking and parallel processing may be advantageous. Moreover, the separation of various system components in the embodiments described above does not require such separation in all embodiments, and the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A method comprising:
   identifying a user interface element that includes a plurality of sub-elements;
   calculating a weight value for each of the plurality of sub-elements;
   storing the weight value in a weighting file;
   identifying a rule for use in modifying one or more attributes associated with presenting the user interface element to emphasize one or more sub-elements corresponding to higher calculated weight values; and
   updating, based on the identified rule, the one or more attributes, wherein updating the one or more attributes is independent of modifying a presentation of the one or more sub-elements and the updated one or more attributes include a traversal rate attribute defining a rate at which each of the sub-elements is traversed, with the traversal rate attribute defining a rate equal to an inverse of a calculated weight value of a particular sub-element divided by a sum of the calculated weight values of the plurality of sub-elements.

2. The method of claim 1, wherein the plurality of sub-elements comprise at least one of: sub-regions of a document, menu elements of a pull-down menu, tiles in a map, images in a grouping of images, entry fields in a form, or divisions of a slider widget.

3. The method of claim 1, wherein the one or more attributes comprise a speed at which the user interface element scrolls through the plurality of sub-elements in a list.

4. The method of claim 1, wherein the updated one or more attributes comprise a background of a scroll bar having varying color according to the calculated weight value for each of the plurality of sub-elements, the varying color corresponding to relative positions of each of the plurality of sub-elements within the user interface element.

5. The method of claim 4, wherein the varying color emphasizes the one or more sub-elements.

6. The method of claim 1, wherein weight values are determined by likelihoods that the plurality of sub-elements will be examined.

7. The method of claim 1, wherein weight values are determined by a proximity of sub-elements to a default sub-element.

8. The method of claim 1, wherein weight values are determined by characteristics of a user.

9. The method of claim 8, wherein the characteristics of a user comprise a geo-location of the user.

10. A computer program product, encoded on a non-transitory computer-readable medium, operable to cause data processing apparatus to perform operations comprising:
    identifying a user interface element that includes a plurality of sub-elements;
    calculating a weight value for each of the plurality of sub-elements;
    storing the weight value in a weighting file;
    identifying a rule for use in modifying one or more attributes associated with presenting the user interface element to emphasize one or more sub-elements corresponding to higher calculated weight values; and
    updating, based on the identified rule, the one or more attributes, wherein updating the one or more attributes is independent of modifying a presentation of the one or more sub-elements and the updated one or more attributes include a traversal rate attribute defining a rate at which each of the sub-elements is traversed, with the traversal rate attribute defining a rate equal to an inverse of a calculated weight value of a particular sub-element divided by a sum of the calculated weight values of the plurality of sub-elements.

11. The computer program product of claim 10, wherein the plurality of sub-elements comprise at least one of: sub-regions of a document, menu elements of a pull-down menu, tiles in a map, images in a grouping of images, entry fields in a form, or divisions of a slider widget.

12. The computer program product of claim 10, wherein the one or more attributes comprise a speed at which the user interface element scrolls through the plurality of sub-elements in a list.

13. The computer program product of claim 10, wherein the updated one or more attributes comprise a background of a scroll bar having varying color according to the calculated weight value for each of the plurality of sub-elements, the varying color corresponding to relative positions of each of the plurality of sub-elements within the user interface element.

14. The computer program product of claim 13, wherein the varying color emphasizes the one or more sub-elements.

15. The computer program product of claim 10, wherein weight values are determined by a proximity of sub-elements to a default sub-element.

16. The computer program product of claim 10, wherein weight values are determined by characteristics of a user.

17. The computer program product of claim 16, wherein the characteristics of a user comprise a geo-location of the user.

18. A system comprising:
a memory operable to store a user interface element comprising a plurality of sub-elements; and
a processor communicatively coupled to the memory operable to:
calculate a weight value for each of the plurality of sub-elements;
store the weight value in a weighting file;
identify a rule for use in modifying one or more attributes associated with presenting the user interface element to emphasize one or more sub-elements corresponding to higher calculated weight values; and
update, based on the identified rule, the one or more attributes, wherein updating the one or more attributes is independent of modifying a presentation of the one or more sub-elements and the updated one or more attributes include a traversal rate attribute defining a rate at which each of the sub-elements is traversed, with the traversal rate attribute defining a rate equal to an inverse of a calculated weight value of a particular sub-element divided by a sum of the calculated weight values of the plurality of sub-elements.

19. The system of claim 18, wherein the plurality of sub-elements comprise at least one of: sub-regions of a document, menu elements of a pull-down menu, tiles in a map, images in a grouping of images, entry fields in a form, or divisions of a slider widget.

20. The system of claim 18, wherein the one or more attributes comprise a speed at which the user interface element scrolls through the plurality of sub-elements in a list.

21. The system of claim 18, wherein the updated one or more attributes comprise a background of a scroll bar having varying color according to the calculated weight value for each of the plurality of sub-elements, the varying color corresponding to relative positions of each of the plurality of sub-elements within the user interface element.

22. The system of claim 21, wherein the varying color emphasizes the one or more sub-elements.

23. The system of claim 18, wherein weight values are determined by a proximity of sub-elements to a default sub-element.

24. The system of claim 18, wherein weight values are determined by characteristics of a user.

25. The system of claim 24, wherein the characteristics of the user comprise a geo-location of the user.

26. The method of claim 1, wherein the rule includes at least one of a parameter, a variable, a policy, an algorithm, an instruction, or a setting for modifying the one or more attributes based on the stored weighting file.

27. The method of claim 1, wherein the rule includes at least one of an identifier of the user interface element, an indicator of which one or more attributes to update, or how to update the one or more attributes based on the weighting file.

28. The method of claim 1, wherein the weight value for each of the plurality of sub-elements is determined as a function of a density of at least one of text tags, images, or where search terms appear in a particular sub-region of a document.

29. The method of claim 1, wherein the weight value for each of the plurality of sub-elements is calculated when information in a document is loaded and is based upon a predefined weight value associated with the type of loaded information.

30. The method of claim 1, wherein the user interface includes a plurality of map tiles and a higher density of features depicted within a particular tile of the plurality of map tiles results in a higher weight value associated with the particular tile.

31. The method of claim 30, further comprising adjusting a pan rate of the map based upon the determined traversal rate for each tile.

32. A method comprising:
identifying a user interface element that includes a plurality of sub-elements;
calculating a weight value for each of the plurality of sub-elements;
storing the weight value in a weighting file;
identifying a rule for use in modifying one or more attributes associated with presenting the user interface element to emphasize one or more sub-elements corresponding to higher calculated weight values; and
updating, based on the identified rule, the one or more attributes, wherein updating the one or more attributes is independent of modifying a presentation of the one or more sub-elements and the updated one or more attributes include a traversal rate attribute defining a rate at which each of the sub-elements is traversed, with the traversal rate attribute defining a rate based at least in part on an inverse of a calculated weight value of a particular sub-element and a sum of calculated weight values of the plurality of sub-elements.

33. The method of claim 32, wherein the plurality of sub-elements comprise at least one of: sub-regions of a document, menu elements of a pull-down menu, tiles in a map, images in a grouping of images, entry fields in a form, or divisions of a slider widget.

34. The method of claim 32, wherein the one or more attributes comprise a speed at which the user interface element scrolls through the plurality of sub-elements in a list.

35. The method of claim 32, wherein the updated one or more attributes comprise a background of a scroll bar having varying color according to the calculated weight value for each of the plurality of sub-elements, the varying color corresponding to relative positions of each of the plurality of sub-elements within the user interface element.

36. The method of claim 35, wherein the varying color emphasizes the one or more sub-elements.

37. The method of claim 32, wherein weight values are determined by likelihoods that the plurality of sub-elements will be examined.

38. The method of claim 32, wherein weight values are determined by a proximity of sub-elements to a default sub-element.

39. The method of claim 32, wherein weight values are determined by characteristics of a user.

40. The method of claim 39, wherein the characteristics of a user comprise a geo-location of the user.

* * * * *

UNITED STATES PATENT AND TRADEMARK OFFICE
CERTIFICATE OF CORRECTION

PATENT NO. : 8,832,590 B1
APPLICATION NO. : 12/202852
DATED : September 9, 2014
INVENTOR(S) : Al-Mohssen Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1333 days.

Signed and Sealed this
Eighth Day of September, 2015

Michelle K. Lee
*Director of the United States Patent and Trademark Office*